(12) United States Patent
Veenstra

(10) Patent No.: US 7,525,824 B2
(45) Date of Patent: *Apr. 28, 2009

(54) METHOD TO CONTROL A FREQUENCY CONVERTER

(75) Inventor: Martin Veenstra, Lausanne (CH)

(73) Assignee: Alstom Technology Ltd, Baden (CH)

( * ) Notice: Subject to any disclaimer, the term of this patent is extended or adjusted under 35 U.S.C. 154(b) by 395 days.

This patent is subject to a terminal disclaimer.

(21) Appl. No.: 11/391,919

(22) Filed: Mar. 29, 2006

(65) Prior Publication Data

US 2006/0268587 A1  Nov. 30, 2006

(30) Foreign Application Priority Data

Mar. 30, 2005  (CH) .................................... 0571/05

(51) Int. Cl.
*H02M 5/45* (2006.01)
*H02P 9/44* (2006.01)

(52) U.S. Cl. .............................. 363/37; 322/28; 363/97

(58) Field of Classification Search .................. 322/20, 322/22, 25, 28, 37; 363/37, 76, 89, 127, 363/97; 290/44
See application file for complete search history.

(56) References Cited

U.S. PATENT DOCUMENTS 6,380,719 B2 *  4/2002  Underwood et al. .......... 322/36
6,856,041 B2 *  2/2005  Siebenthaler et al. ......... 290/44
7,180,270 B2 *  2/2007  Rufer et al. ................... 322/20
2004/0119292 A1   6/2004  Datta et al.

FOREIGN PATENT DOCUMENTS

DE       103 30 473       1/2005

OTHER PUBLICATIONS

J. Chatelain, "Machines electriques" in Traites d'Electricite, 1st Ed., Lausanne, Switzerland: Presses Polytechniques et Universitaires Romandes, 1983 vol. X.

* cited by examiner

*Primary Examiner*—Jessica Han
(74) *Attorney, Agent, or Firm*—Darby & Darby

(57) ABSTRACT

A method for the control of a static frequency converter, in which an alternating voltage provided by a generator with a first frequency is first rectified in a switched rectifier, and in which the DC-voltage thus present in an intermediate circuit is inverted to an alternating voltage with a grid frequency by means of a switched inverter. The generator is provided with an excitation coil and with means for controlling the power made available to the grid by means of controlling the strength of the excitation field provided by the excitation coil and, if need be, also of the phase relationship between the voltage of the frequency converter and the generator voltage and the grid voltage, respectively. The generator side alternating voltage of the rectifier is controlled to a frequency which is substantially constant in accordance with the first frequency and the inverter is controlled on the basis of the measured value of the DC-voltage in the intermediate circuit.

16 Claims, 12 Drawing Sheets

METHOD TO CONTROL A FREQUENCY CONVERTER

Priority is claimed to Swiss Patent Application No. CH 00571/05, filed on Mar. 30, 2005.

The present invention relates to a method to control a static frequency converter, with which method an alternating voltage generated in a generator and having a first frequency is first rectified in a switched rectifier and the direct voltage thus present in an intermediate circuit is converted in a switched inverter into an alternating voltage having a grid frequency, whereby the generator is a generator having at least one excitation coil.

BACKGROUND

Large power plants that serve to generate electricity normally encompass a synchronous generator that is directly connected to the electric grid. The generator is driven by a turbine, which can be a gas turbine, a steam turbine or a water turbine.

As a result of the fact that the generator is connected directly to the grid, the speed of the generator is given and constant. A problematic aspect of this fact is that the optimal speed of the turbine is normally not the same as that of the generator, so that consequently a mechanical gearbox is often arranged between the turbine and the generator. This is particularly true of gas turbines, whose optimal operating speed is considerably higher that the grid frequency. In the case of water turbines having a low speed, at least a partial adaptation can be achieved by using a generator having the appropriate number of poles.

Such a gearbox is sensitive and expensive to produce whenever large quantities of power have to be transformed, in addition to which it requires an extraordinary amount of maintenance. Moreover, gearboxes cannot be employed in the highest power ranges, as a result of which the configuration of the turbine and its mode of operation have to be selected outside of the optimum range. Furthermore, the optimal speed of the turbine depends on the load present and the optimal efficiency at different loads can only be ensured if the turbine can be operated at different speeds. Unfortunately, this is not possible in the case of a rigid arrangement.

In order to circumvent this problem, German application DE 103 30 473 A1, for instance, describes the possibility of using a flexible electronic solution to replace the rigid connection involving a gearbox. The turbine is coupled directly to the synchronous generator but the latter is connected to the grid via a frequency converter (see FIG. 1 in DE 103 30 473 A1). A completely regulated voltage intermediate circuit converter (voltage source converter) having a controlled rectifier (converter on the machine side), a capacitive intermediate circuit and a controlled inverter (converter on the grid side) is used in order to efficiently uncouple harmonics between the generator and the grid.

In order to avoid excessive switching losses, the converter is operated in the square-wave mode, in which the switching frequency corresponds to the fundamental frequency. In this case, only the frequency between the input voltage and the output voltage can be varied, but not the amplitude (hence the name frequency converter). The amplitude of the voltage can be adapted by means of the excitation of the generator, as is commonly done in the classic arrangement with a direct connection between the generator and the grid.

The generated active power and reactive power can be controlled by means of the excitation of the generator and so can the phase shift between the generator and the voltages of the rectifier as well as between the inverter and the grid voltages. Even though DE 103 30 473 A1 describes these fundamental principles of the mode of operation of such a converter, this document does not indicate any specific strategy or structure for controlling the converter since various solutions are possible.

SUMMARY OF THE INVENTION

Accordingly, it is an object of the invention to put forward a stable and simple possibility to control a static frequency converter. This is to be done in conjunction with a frequency converter in which an alternating voltage generated in a generator and having a first frequency is first rectified in a switched rectifier and the direct voltage thus present in an intermediate circuit is converted in a switched inverter into an alternating voltage having a grid frequency. In this context, the generator has at least one excitation coil that can be actuated in a regulated manner. This means that, in order to control the power fed into the grid, means are provided for regulating at least the strength of the excitation field generated by the at least one excitation coil and optionally also the phase relation between the frequency converter voltage and the generator voltage or grid voltage. The present invention provides a method for controlling a static frequency converter wherein the control of a frequency converter in the rectifier is carried out in such a way that the frequency of the alternating voltage of the rectifier on the generator side is regulated to an essentially constant value of the first frequency, and the control in the inverter is carried out on the basis of a measured value of the direct voltage in the intermediate circuit.

According to the present invention, the frequency converter is kept at a fixed frequency on the side of the generator so to speak, and the frequency is regulated exclusively on the side of the grid. Symmetry-related considerations explained in greater detail below show that such a control is surprisingly easy to achieve in that the direct voltage in the intermediate circuit is used as the regulating parameter, preferably the voltages present in the intermediate circuit over the capacitances.

Naturally, the frequency of the turbine and/or of the generator can be set, for instance, for partial load so that it can continue to run within the optimal operating range. In this situation, a lot of time is available to set a different frequency. Accordingly, with such a change in the frequency of the turbine and/or of the generator, the control of the rectifier can be adapted quasi-steadily (that is to say, dynamically, but with such slow changes to the state as to remain close to the stationary state).

In a first embodiment of the method according to the invention, the control in the inverter is carried out in such a way that the frequency of the inverter on the grid side is regulated according to the following function $$\omega_i = \omega_n + \Delta\omega$$

wherein the function $\Delta\omega$, the frequency differential between the frequency of the inverter $\omega_i$ and of the grid $\omega_n$, is expressed by $$\Delta\omega \triangleq K_P(u_C - u^*_C)|, \quad (20)$$

wherein $K_P$ stands for a specified, proportional control gain, and $u^*_C$ stands for a reference value of the capacitance voltage that is selected as a function of the desired reactive power, optionally dynamically. The reference value $u^*_C$ can be set according to formula (41) shown below in conjunction with formula (3), whereby in formula, (3), $\hat{u}_1$ is replaced with $U_i$ according to formula (41).

Thus, in the state of equilibrium, the value of $\Delta\omega$ is typically zero, since the frequency of the inverter and of the grid in this state should be the same. In this context, the function $\Delta\omega$, preferably also taking into consideration the damping, can be employed with a predefined differential control gain $K_D$ for purposes of the control in the inverter, and this is done concretely according to the formula:

$$\Delta\omega' \stackrel{\Delta}{=} K_P(u_C - u_C^*) + K_D \frac{d}{dt}(u_C - u_C^*) = \Delta\omega + \frac{K_D}{K_P}\frac{d\Delta\omega}{dt} \quad (21)$$

Another embodiment of the method according to the invention is characterized in that the strength of the excitation field generated by the at least one excitation coil and its phase relation is set by means of an excitation voltage that is controlled as a function of the generator voltage, the generator frequency, the active power and the reactive power of the generator. This is preferably done according to an equation that is depicted in FIG. 8 and that can be derived from formulas (25) to (38).

According to another embodiment, the frequency converter is a three-stage converter whereby, for regulation purposes, preferably the direct voltage in the three-level intermediate circuit is ascertained as the mean value of the voltages present over the two capacitances between the two levels + and 0 as well as between the two levels 0 and −.

In another embodiment, the controlled rectifier and/or the controlled inverter are operated in fundamental-frequency clocking, whereby the controlled rectifier is preferably a three-level rectifier and the controlled inverter is preferably a three-level inverter, both of which are operated in fundamental-frequency clocking.

Typically, the static frequency converter is configured in such a way as to comprise thyristors such as, for instance, GTOs, IGBTs, MOSFETs or ICGTs.

Another embodiment is characterized in that a central control unit is provided which uses the measurement of the voltage and/or the current upstream and/or downstream from the static frequency converter to make an adaptation of the amplitude of the alternating voltage fed into the grid by appropriately actuating the means for controlling the strength of the excitation field generated by the excitation coil.

As already mentioned, the present invention also encompasses a device to carry out the method as was described above. The device is particularly characterized in that a generator is equipped with at least one regulatable excitation coil, a static frequency converter comprising at least one controlled rectifier in fundamental-frequency clocking and at least one controlled inverter in fundamental-frequency clocking, as well as at least one control unit to regulate these elements. In addition, means for measuring the values of the direct voltage are arranged in the intermediate circuit, whereby these measured values are employed for control purposes in the inverter. The actuation of the regulatable excitation coil involves means with which the amplitude of the alternating current used for the excitation is adapted to the requirements of the grid.

Other preferred embodiments of the invention are described in the dependent claims.

BRIEF DESCRIPTION OF THE DRAWINGS

The invention will be explained in greater detail below with reference to embodiments in conjunction with the drawings. The following is shown.

DETAILED DESCRIPTION

Figure 1:
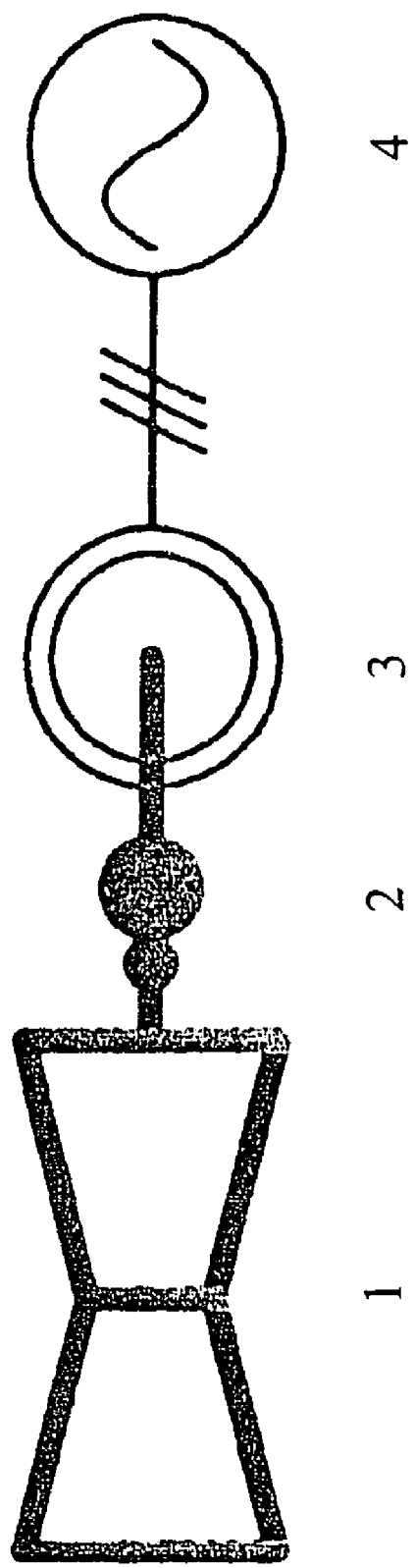
FIG. 1 a schematic diagram of a power plant employing a gear arrangement.

As already explained, in conventional power plants of the type shown, for example, in FIG. 1, a turbine 1 is connected directly to a generator 3 via a gearbox 2 arranged on a shared shaft. The generator is subsequently connected to the grid 4 either directly or via a transformer. The drawbacks of such a solution have already been explained above.

Figure 2:
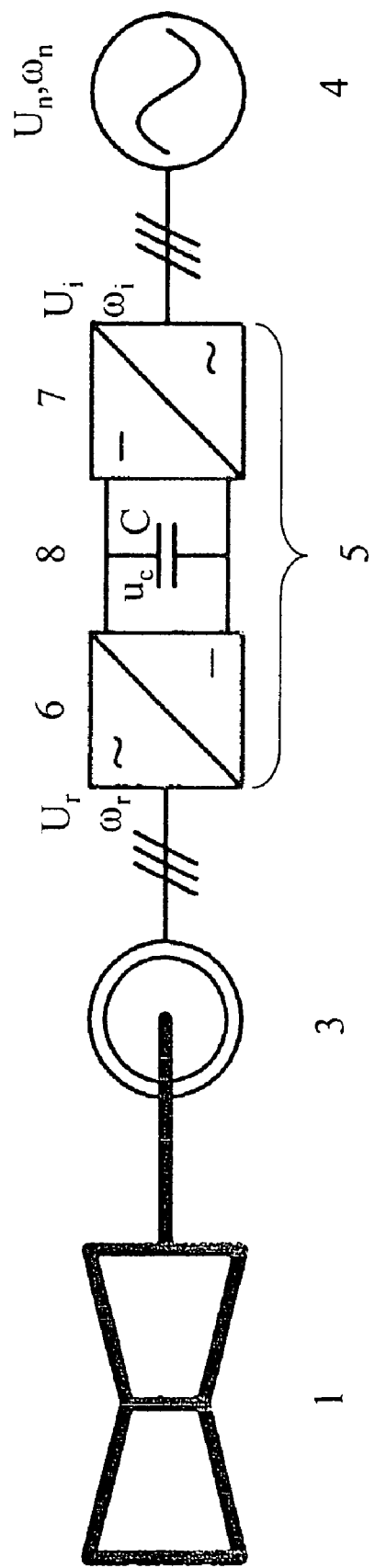
FIG. 2 a schematic diagram of a power plant employing a static frequency converter.

In contrast to this, the solution being proposed here uses an arrangement as shown in FIG. 2. In this case, the turbine 1 is directly and rigidly connected to the generator 3 via the shaft. The alternating voltage (typically three-phase) generated by the generator 3 is subsequently converted in a frequency converter 5 and adapted to the frequency of the grid 4. The frequency converter 5 consists of a rectifier 6 that generates a direct current from the alternating current supplied by the generator. This is done by means of power electronics, that is to say, on the basis of switched thyristors such as, for instance, GTOs, IGBTs, MOSFETs or ICGTs.

In the next step, the direct voltage present in the downstream intermediate circuit 8 (here, a capacitance C is arranged between each of the two levels of the intermediate circuit) is once again converted into alternating voltage in an inverter 7, namely, at a frequency that is adapted to the grid.

The properties and the behavior of electric machines are comprehensively explained in the literature, for example, in C.-M. Ong, Dynamic Simulation of Electric Machinery. 1$^{st}$ Ed., Upper Saddle River, N.J., United States: Prentice Hall, 1998, or in J. Chatelain, Machines électriques in Traités d'Électricité, 1$^{st}$ Ed., Lausanne, Switzerland: Presses Polytechniques et Universitaires Romandes, 1983, Vol. X. Below, the underlying behavior will only be taken into consideration in a simplified form, ignoring losses since this is sufficient to elucidate the principles of the proposed strategy of regulating a frequency converter. Consequently, machines are assumed here in which a complete conversion of mechanical energy into electric energy takes place and the power electronic system carries out a loss-free conversion of direct-current energy into alternating-current energy (and vice versa).

Electric machines and the grid are primarily inductive. The interaction between the machine, the voltage intermediate circuit converter (or frequency converter) and the grid can be appropriately modeled [sic] by two voltage sources having the voltages E and U, which are connected to each other via an inductance L. This situation is shown schematically in FIG. 3a). The vector diagram depicted in FIG. 3b) shows the relationships between the two voltages E and U as well as between the current I that flows through the inductance L, this being for sinusoidal signals having an angular frequency Ω. For a circuit having a single phase, the following expressions are obtained for the active power P and for the reactive power Q as they occur at the voltage source:

$$P = UI \cos\varphi = \frac{UE \sin\delta}{\omega L} \quad (1)$$

$$Q = UI \sin\varphi = \frac{U(E \cos\delta - U)}{\omega L} \quad (2)$$

The vector diagram also shows how the vector of the voltage E has to be changed in order to alter the active power P and/or the reactive power Q. For small values of the displacement angle δ, the active power P is essentially determined by the angle δ, while the reactive power Q is mainly determined by the amplitude of E.

Figure 4:
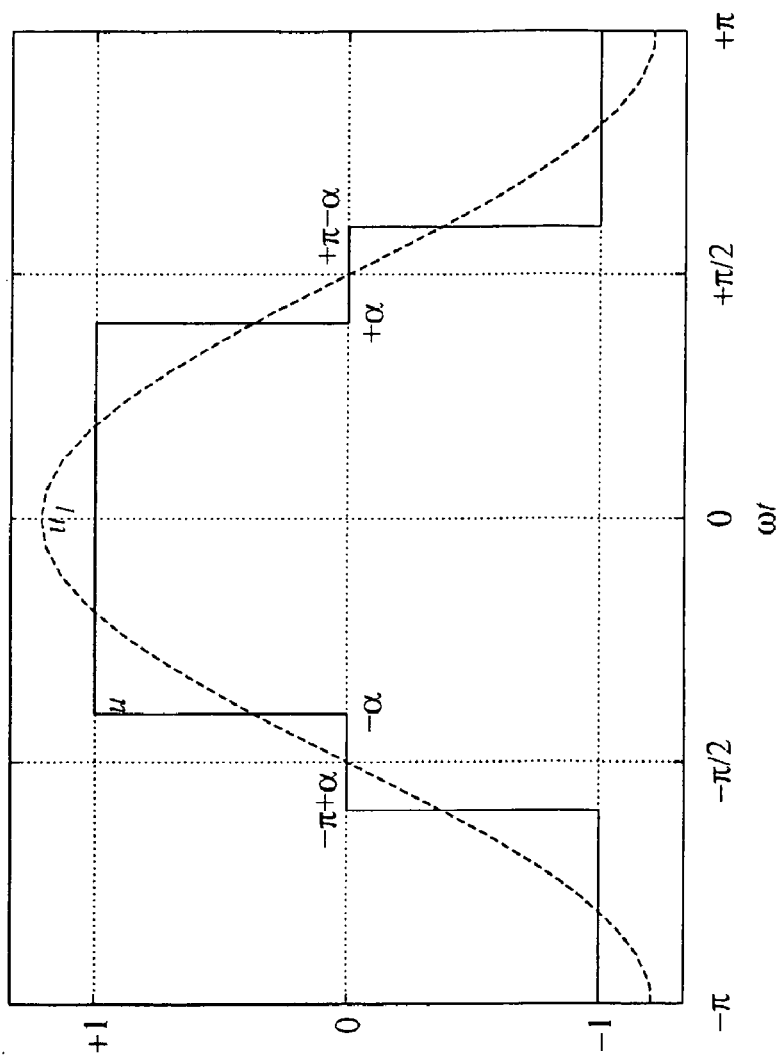
FIG. 4 the output voltage waveform and the fundamental component of a three-stage converter operated in the square-wave mode.

FIG. 4 shows the waveform of the output voltage generated by a three-stage converter operated in the square-wave mode. The amplitude equals the voltage $u_C$ over the capacitance in the intermediate circuit. The amplitude $\hat{u}_1$ of the fundamental wave $u_1$ is proportional to the voltage over the capacitance, with a modulation index m that is a function of the commutation angle α:

$$\hat{u}_1 = m u_C, \quad (3)$$

$$m = \frac{4}{\pi} \sin\alpha. \quad (4)$$

A commutation level $u_\alpha$ can be defined which is equal to the fundamental wave at the moments of the commutation:

$$u_\alpha = \hat{u}_1 \cos\alpha. \quad (5)$$

For the commutation angle α, an optimal value should be selected with respect to the generated harmonics. Minimal harmonics are obtained around a value of $$\alpha \approx \frac{5}{12}\pi = 75°. \quad (6)$$

This minimum is quite flat, and consequently, variations within the range of ±5° still yield good power.

Under stationary conditions of operation, the active power P is determined completely by the mechanical torque $T_m$, which is supplied by the turbine. The behavior is determined by the dynamic movement equation $$J\frac{d\omega_m}{dt} = T_m - T_e, \quad (7)$$

wherein J stands for the moment of inertia, $\omega_m$ for the mechanical angular frequency of the generator and $T_e$ for the electromagnetic torque. The relationships between power and torque are as follows $$P_m = \omega_m T_m, \quad (8)$$

$$P_e = \omega_m T_e. \quad (9)$$

wherein $P_m$ stands for the mechanical power and $P_e$ for the electromagnetic power.

In a cylindrical synchronous machine, the electromagnetic torque in equilibrium can be expressed as $$T_e \approx \frac{3}{\omega_m} \frac{UE}{X_d} \sin\delta = T_k \sin\delta, \quad (10)$$

wherein $X_d$ is the synchronous reactance of the d-axis, $T_k$ is the (excitation-dependent) dynamic breakdown torque and δ is the load angle that corresponds to the above-mentioned displacement angle between the rotor and the grid. The reactive power Q is determined by the excitation although it is also dependent on the active power P.

The dynamic behavior of the machine can be described as "voltage behind the transient reactance" with a damping term. In the case of small values of the variation of the speed, the damping torque is approximately proportional to the speed and the resulting electromagnetic torque can be approximated as $$T_e \approx \frac{3}{\omega_m} \frac{UE'}{X'_d} \sin\delta + D\Delta\omega = T'_k \sin\delta + D\Delta\omega \quad (11)$$

wherein $X'_d$ is the transient reactance of the d-axis, E' is the corresponding voltage of the excitation, $T'_k$ is the dynamic breakdown torque and D is the damping coefficient.

By employing the difference of the frequency of the rotor and the grid, taking into account the number p of pole pairs according to $$\Delta\omega = p\omega_m - \omega_n |, \quad (12)$$

the load angle or displacement angle δ can be expressed as $$\delta = \int \Delta\omega dt \quad (13)$$

The dynamic movement equation (7) can now be written as $$\frac{J}{p}\frac{d^2\delta}{dt^2} + D\frac{d\delta}{dt} + T'_k \sin\delta = T_m \quad (14)$$

This result is known as the "swing equation".

Figure 3:
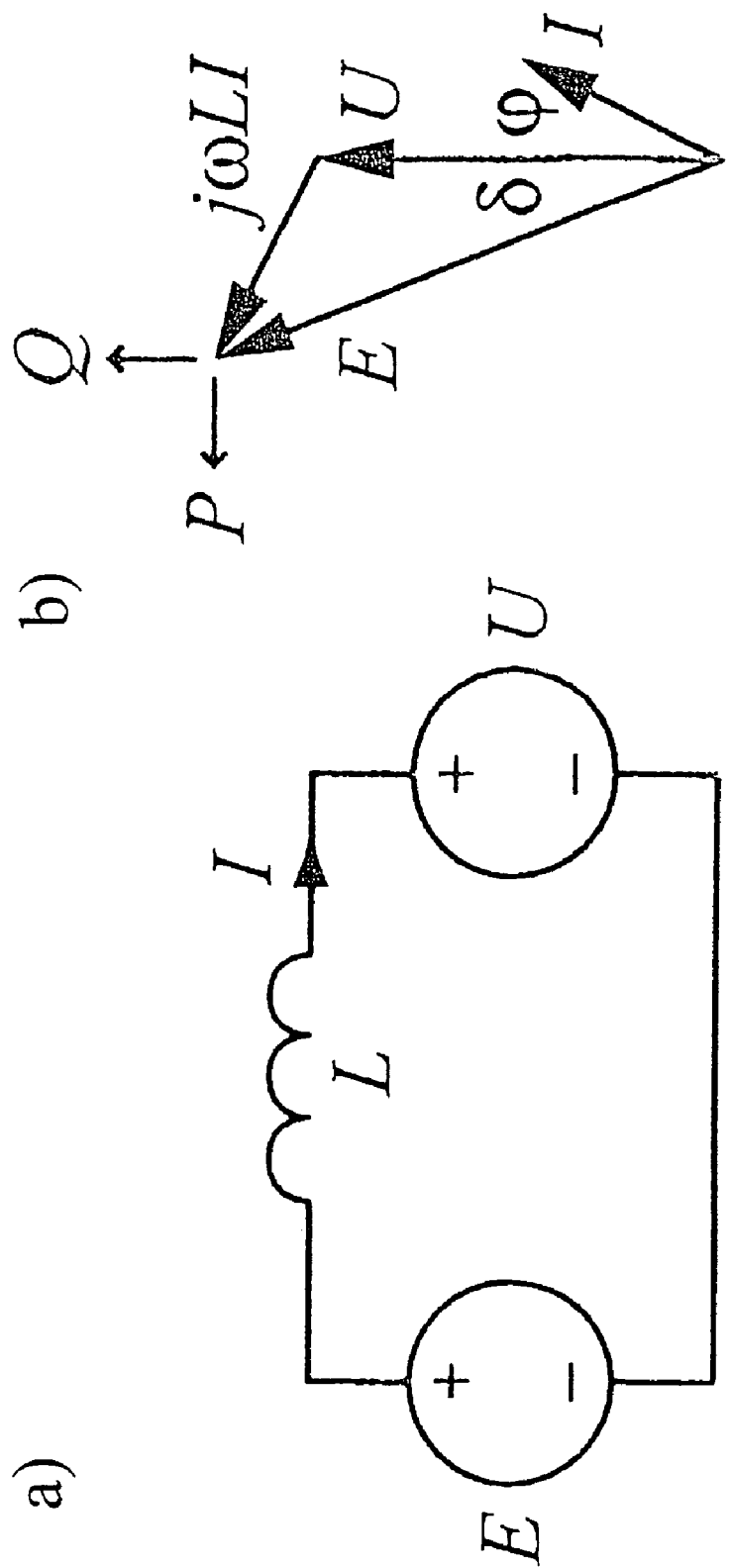
FIG. 3 (a) a circuit diagram and (b) a vector diagram of two voltage sources with the voltages U and E which are connected via an inductance.

If this result is then applied to an arrangement according to FIG. 2, the following additional considerations are necessary: in the arrangement according to FIG. 2, a frequency converter 5 is connected between the generator 3 and the grid 4. Owing to the voltage intermediate circuit characteristic of the proposed converter 5, its coupling to the generator 3 configured as a synchronous generator as well as its coupling to the grid 4 can both be depicted as shown in FIG. 3.

In the first case, the rectifier 6 functions somewhat like a grid for the generator. If the rectifier is regulated at a constant frequency $\omega_r$, this results in the same machine dynamics and machine mode of operation as explained above. The frequency of the rectifier, however, can be adapted in a quasi-steady manner in order to allow an optimal mode of operation of the turbine and generator. On the side of the alternating current, that is to say, towards the generator, the rectifier 6 generates a voltage whose value $U_r$ is proportional to the voltage $u_C$ over the capacitance C in the intermediate circuit 8. Towards the direct current side, the rectifier supplies a current $i_r$ which corresponds to the converted power $P_r$ $$P_r = u_C i_r = P_e \tag{15}$$

which corresponds to the electromagnetic power $P_e$ that is supplied by the generator.

In the second case, the voltage source E corresponds to the voltage of the inverter 7 on its alternating current side. Its frequency $\omega_i$ on the alternating current side can be completely regulated and the magnitude of the voltage $U_i$ is proportional to the voltage $u_C$ over the capacitance in the intermediate circuit 8. The voltage source U corresponds to the grid whose voltage $U_n$ as well as its frequency $\omega_n$ are normally predefined. The inductance L is formed by the transformer 16 as well as by the inductances in the grid and, if applicable, additional inductances of filters.

On the direct current side, the inverter draws a current $i_i$ which corresponds to the converted power $P_r$ $$P_i = u_C i_i = 3 \frac{U_n U_i \sin\delta}{\omega_n L} \tag{16}$$

that is supplied to the grid 4. In the expression for this current $i_i$, $$i_i = \frac{3}{u_C} \frac{U_n U_i}{\omega_n L} \sin\delta = I_k \sin\delta \tag{17}$$

$I_k$ stands for a maximum or breakdown current.

The difference between the currents (or the power) of the rectifier and inverter flows through the capacitance C in the intermediate circuit 8 and charges it according to $$C \frac{du_C}{dt} = i_r - i_i \tag{18}$$

This behavior according to formula (18) together with formulas (15), (16) and (17), has the same form as the behavior that describes the movement of the generator according to formulas (7), (8), (9) and (10). Correspondingly, a duality exists between the voltage over the capacitance C and the frequency of the generator 3, between the current in the intermediate circuit 8 and the torque, as well as between the capacitance C and the moment of inertia.

In order to make such a system seem like a conventional system, a new regulation strategy can be employed which imparts the frequency converter with similar properties to those of a synchronous generator. Following the cited duality, this can be achieved in that the frequency differential $\Delta\omega$, which is defined as $$\Delta\omega = \omega_i - \omega_n, \tag{19}$$

is set as being proportional to the error or to the deviation of the voltage over the capacitance C; this is done according to $$\Delta\omega \triangleq K_P(u_C - u^*_C) \tag{20}$$

In this context, $u^*_C$ is a reference value for the voltage over the capacitance C.

In the final analysis, the reference value $u^*_C$ can be derived from the reactive power desired by the operator of the power plant and it can also be set dynamically. In order to determine $u^*_C$, it is possible to employ, for instance, the formula below, which is based on formula (3) in combination with formula (4)

$$u^*_C = U_i/m = \pi U_i/(4 \sin\alpha) \tag{20a}$$

In this context, a value that has been optimized with respect to the harmonics can be used as the commutation angle $\alpha$ (see formula 6). For purposes of determining the alternating voltage $U_i$ of the inverter 7, formula (41), which is discussed below, can be employed, so that the reference value $u^*_C$ is then formulated as a function of $\alpha$, $U_n$, $\omega_n$, L, $Q_n$, and $P_n$. Here, the values of the alternating voltage $U_n$ of the grid as well as the angular frequency $\omega_n$ of the grid are predefined by the grid and cannot be freely selected. The reactive power $Q_n$ and the active power $P_n$ of the grid can be set by the power plant operator, whereby especially $P_n$ is influenced by the grid and the transformer inductance (as L) as well as by the torque of the turbine. Therefore, a target value for $u^*_C$ that is needed in principle, is first predefined.

$K_P$ is a proportional control gain and is likewise predefined.

In order to additionally dampen the system, a corresponding term can be added with a differential control gain $K_D$:

$$\Delta\omega' \triangleq K_P(u_C - u^*_C) + K_D \frac{d}{dt}(u_C - u^*_C) = \Delta\omega + \frac{K_D}{K_P} \frac{d\Delta\omega}{dt} \tag{21}$$

The value of $K_D$ is likewise predefined and the values for $K_P$ and $K_D$ are selected in such a way that the system responds quickly, no strong oscillations occur after transitions and there are as few harmonics as possible.

The expression for the displacement angle $\delta'$ can then be written as $$\delta' = \int \Delta\omega' dt = \int \Delta\omega dt + \frac{K_D}{K_P} \Delta\omega = \delta + \frac{K_D}{K_P} \frac{d\delta}{dt} \tag{22}$$

For small values of the damping $K_D$, the current in the intermediate circuit according to formula (17) can be approximated by means of $$i_i = I_k \sin\delta' \approx I_k \left( \sin\delta + \cos\delta \frac{K_D}{K_P} \frac{d\delta}{dt} \right) \tag{23}$$

Using these equations, the following expression for the behavior according to formula (18) in the intermediate circuit is obtained $$\frac{C}{K_P}\frac{d^2\delta}{dt^2} + I_k \cos\delta \frac{K_D}{K_P}\frac{d\delta}{dt} + I_k \sin\delta = i_r, \quad (24)$$

which is a result similar to the swing equations of the generator according to formula (14).

In order to perform the regulation, formula (20), optionally taking into consideration the damping of formula (21), is resolved as $$\omega_i = \omega_n + \Delta\omega$$

and the inverter 7 is actuated in such a manner that it displays a frequency $\omega_i$ towards the grid. As explained above, the rectifier 6 is set to the fixed frequency $\omega_r$.

The regulation will now be explained with reference to FIGS. 5 to 8.

Figure 5:
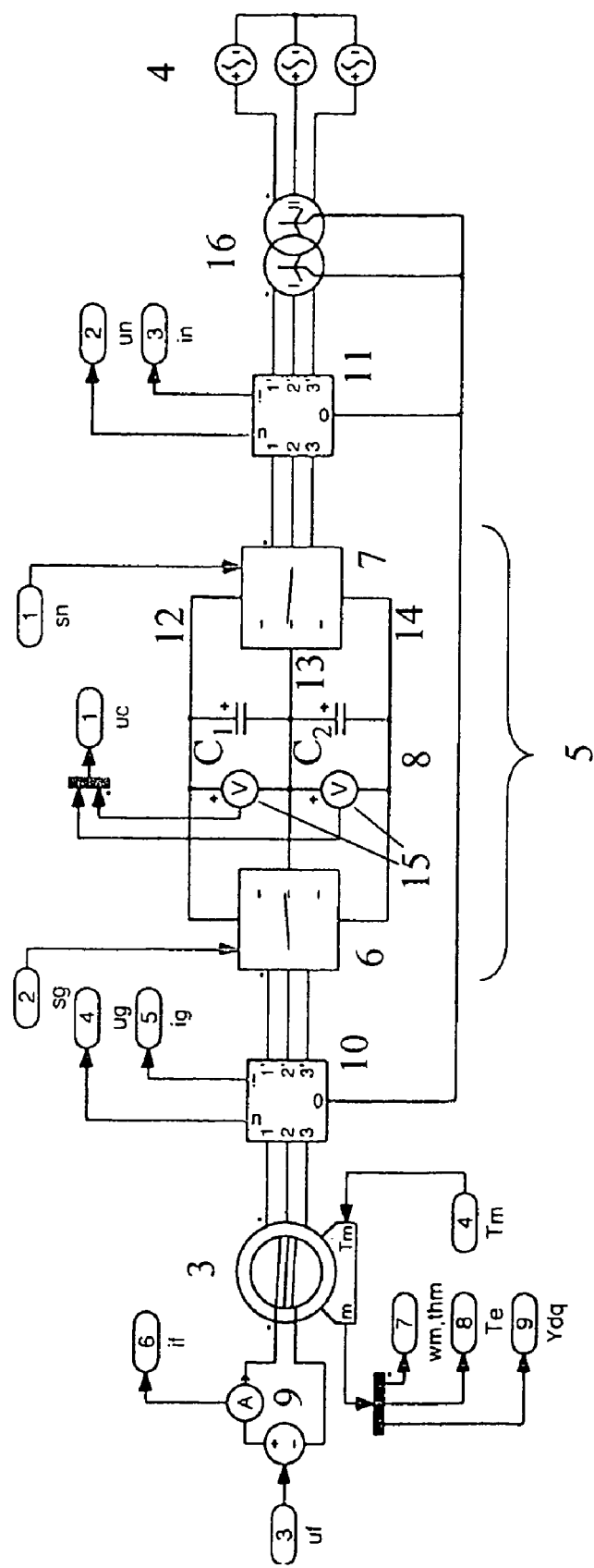
FIG. 5 a schematic circuit diagram of the power plant.

FIG. 5 depicts the electric switching circuit that will serve as the basis for the considerations outlined below. The figure shows a generator 3 whose excitation voltage is set via an excitation 9. This excitation 9 supplies an excitation voltage $U_f$ as well as an excitation current $i_f$ in a regulated manner. The input value that has to be set for the excitation voltage $U_f$ will be explained below.

The mechanical torque $T_m$ of the turbine acts on the generator, giving rise to the circuit frequency $\omega_m$ (wm in FIG. 5) of the generator 3, to the angle position thm in the rotor (phase), to the electromagnetic torque Te and to the magnetic flux Ydq.

The generator 3 transfers the generated electric energy in the form of three phases. A measurement device 10 here supplies the values of the generator voltage $U_g$ as well as the generator current ig. The three phases are then fed to the rectifier 6. The rectifier 6 is controlled by a control signal sg. This rectifier converts the alternating current into direct current, whereby the direct current in this three-stage converter is kept at three levels in the intermediate circuit 8, namely, at the (+) level according to reference numeral 12, at the (0) level according to reference numeral 13 and at the (−) level according to reference numeral 14 (also see FIG. 4). A capacitance $C_1$ and a capacitance $C_2$ are arranged between levels 12 and 13 as well as between levels 13 and 14, respectively. The voltages present over these capacitances are picked up at measurement points 15 and made available for the regulation.

The three levels of the direct current are subsequently converted into alternating current in the inverter 7 that is regulated via a control signal sn. The three phases of this alternating current are monitored by a measurement device 11, that is to say, the alternating voltage $U_n$ of the grid as well as the current supplied to the grid are monitored. This is followed by the grid 4 downstream from a transformer 16.

Figure 6:
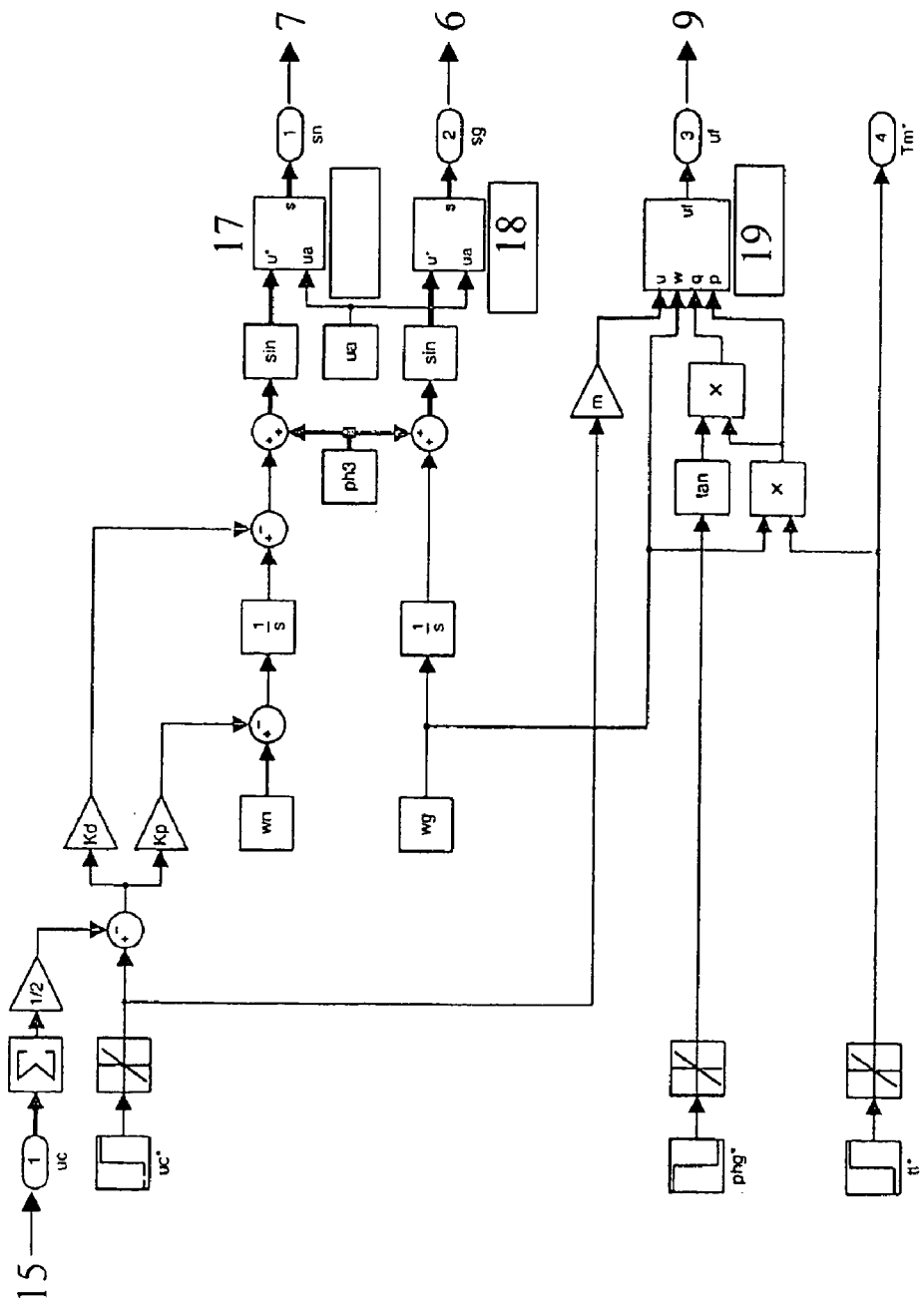
FIG. 6 a schematic diagram of the regulation according to the invention.
Figure 7:
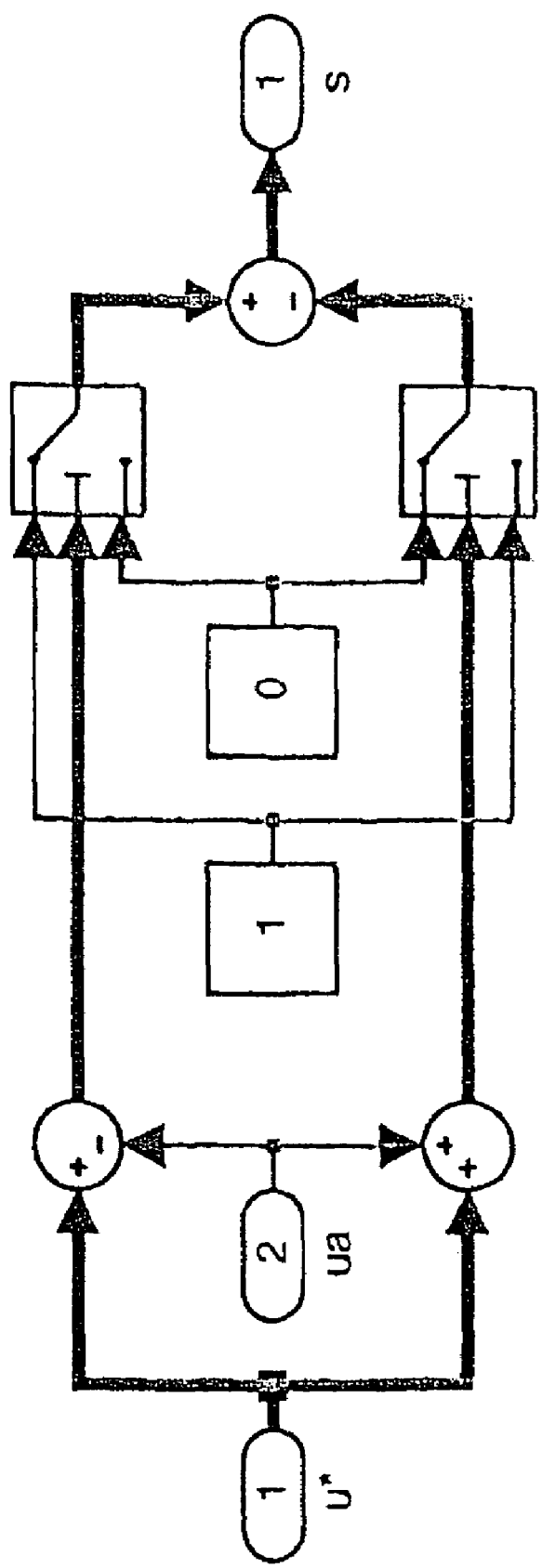
FIG. 7 a modulator as schematically shown in FIG. 6, in detail.

The regulation of such a device is shown schematically in FIG. 6. The measured value of the direct voltage $u_C$ in the intermediate circuit 8 is the only parameter that is regulated and, as can be clearly seen above, this is the mean value of the two voltages picked up at the measurement points 15 ($u_C = \frac{1}{2}(u_{C1} + u_{C2})$). The reference value of the capacitance voltage $u^*_C$ as well as the value of phg* (generator phase, is used to set the reactive power) and the value of tt* (corresponds to the mechanical torque $T_m^*$ of the turbine, setting of the active power) are statically (or dynamically) defined.

As already explained above, the rectifier 6 is set at a fixed frequency. Accordingly, it can be seen in FIG. 6 how the control signals sg for the rectifier 6 are generated on the basis of the predefined value of the generator frequency $\omega_g$ (corresponding to wg in FIG. 6) after an appropriate setting of the phase shift ph3 (−0, −120, −240) for the three phases present and after evaluation of a sine function in a modulator 18 (see below for the details). Therefore, no reference is made to the regulation parameter $u_C$ in order to control the rectifier 6.

The excitation voltage $U_f$ is likewise set without referring to the value of $u_C$. As shown in the lower part of FIG. 6, only phg* and tt*, $u^*_C$ as well as $\omega_g$ and $U_g$ are employed as input values in order to set the excitation voltage $U_f$, whereby these values are evaluated on the basis of formulas (25) to (36), which will be discussed below and depicted in FIG. 8.

In other words, the excitation voltage $U_f$ is set as a function of the desired reactive power Q, of the active power P, of the generator voltage $U_g$ and of the generator frequency $\omega_g$. Details of the formula for the excitation voltage $U_f$ can be found below, especially in FIG. 8.

The essential part of the regulation now takes place with reference to the control of the inverter 7. In this case, the measured value of the direct voltage $u_C$ in the intermediate circuit 8 is evaluated with the integrated formulas (19) to (21) resolved on the basis of the circuit frequency $\omega_i$ of the inverter 7.

This means that, first of all, the difference $u_C - u^*_C$ is formed and this difference is subsequently multiplied by the proportional control gain $K_p$ as well as by the differential control gain $K_D$, and afterwards the product is integrated with $K_P$ and the $K_D$ expression is inserted through the integration in order to obtain the phase angle for the control of the inverter 7. For this purpose, the phase relation for the three phases is set once again at the end by means of the phase displacement ph3 and the corresponding value is transferred to a modulator 17 following an evaluation with a sine function. From this, the modulator 17 generates a control signal sn for the inverter 7.

The general pulse width of the square-wave blocks is specified by a value ua (commutation level) whereby an attempt is made to avoid harmonic waves, if possible (also see formulas 3 to 6). Therefore, the value of ua corresponds to the desired commutation angle.

The signals sn or the signals sg are generated in the modulator 17 and in the modulator 18, respectively, according to the following scheme (see FIG. 7):

u*>ua→s=1

−ua≦u*≦ua→s=0 u*<−ua→s=−1

The regulation was ascertained on the basis of typical reference values for a turbogenerator and for a transformer with realistic values for capacitances in the intermediate circuit, a process in which the parameters indicated in Tables 1 and 2 were used:

TABLE 1

System parameters of the simulation

| Description | Variable | Value | Unit |
|---|---|---|---|
| Machine | | | |
| Apparent power | S | 73.8 | MVA |
| Power | P | 59.0 | MW |
| Voltage | U | 11.5 | kV |
| Current | I | 3.705 | kA |
| Power factor | cos φ | 0.80 | |
| Frequency | f | 85 | Hz |
| Pole pair number | p | 1 | |
| Basic impedance | Z | 1.792 | Ω |
| Stator resistance | $R_s$ | 0.0035 | p.u. |
| Stator leakage reactance | $X_{ls}$ | 0.160 | p.u. |
| d-axis synchronous reactance | $X_d$ | 2.47 | p.u. |

TABLE 1-continued

System parameters of the simulation

| Description | Variable | Value | Unit |
|---|---|---|---|
| q-axis synchronous reactance | $X_q$ | 2.28 | p.u. |
| d-axis transient reactance | $X'_d$ | 0.239 | p.u. |
| q-axis transient reactance | $X'_q$ | 0.390 | p.u. |
| d-axis subtransient reactance | $X''_d$ | 0.181 | p.u. |
| q-axis subtransient reactance | $X''_q$ | 0.190 | p.u. |
| Transient open-circuit time constant of the d-axis | $T'_{do}$ | 6.65 | s |
| Transient open-circuit time constant of the q-axis | $T'_{qo}$ | 0.78 | s |
| Subtransient open-circuit time constant of the d-axes | $T''_{do}$ | 0.018 | s |
| Subtransient open-circuit time constant of the q-axes | $T''_{qo}$ | 0.027 | s |
| Time constant of the moment of inertia | $T_J$ | 0.80 | s |
| Grid | | | |
| Voltage | U | 11.5 | kV |
| Frequency | f | 50 | Hz |
| Transformer | | | |
| Winding ratio | n | 1 | |
| Resistance | R | 0.005 | p.u. |
| Inductance | L | 0.20 | p.u. |
| Magnetization inductance | $L_m$ | 100 | p.u. |
| Converter | | | |
| Intermediate circuit capacitance[a] | C | 25 | p.u. |
| Control | | | |
| Commutation angle | α | 74 | ° |
| Proportional gain factor | $K_P$ | 0.2 | p.u. |
| Differential gain factor | $K_D$ | 0.2 | p.u. |

[a]The total energy stored corresponds to 35 J/kVA.

TABLE 2

Nominal values of the simulation in the per unit system[b]

| Description | Variable | Value |
|---|---|---|
| Machine | | |
| Phase voltage amplitude | $u_g$ | 1.0 |
| Phase current amplitude | $i_g$ | 1.0 |
| Angular frequency | $\omega_g$ | 1.7 |
| Apparent power | $S_g$ | 1.5 |
| Power factor | cos φ | 0.80 |
| Mechanical torque | $T_m$ | 0.71 |
| Grid | | |
| Phase voltage amplitude | $u_n$ | 1.0 |
| Phase current amplitude | $i_n$ | 1.0 |
| Circuit frequency | $\omega_n$ | 1.0 |
| Apparent power | $S_n$ | 1.5 |
| Power factor | cos φ | 0.80 |
| Inverter | | |
| Voltage over capacitance in the intermediate circuit | $u_C$ | 0.82 |

[b]In the per unit system, the quantities are each related to the base quantity, and this is done according to the formula: basic value in p.u. = (quantity in SI units)/(nominal value of the voltage or power).

The excitation of the generator via the voltage $U_f$ is calculated employing a standard machine model (in this context, see, for instance, C.-M. Ong, Dynamic Simulation of Electric Machinery. 1$^{st}$ Ed., Upper Saddle River, N.J., United States: Prentice Hall, 1998, and J. Chatelain, "Machines électriques" in Traités d'Électricité, 1$^{st}$ Ed., Lausanne, Switzerland: Presses Polytechniques et Universitaires Romandes, 1983, Vol. X.).

The various operation points are taken into consideration by means of the reference values for the voltage, frequency and reactive power or active power, and employing formula (3).

Figure 8:
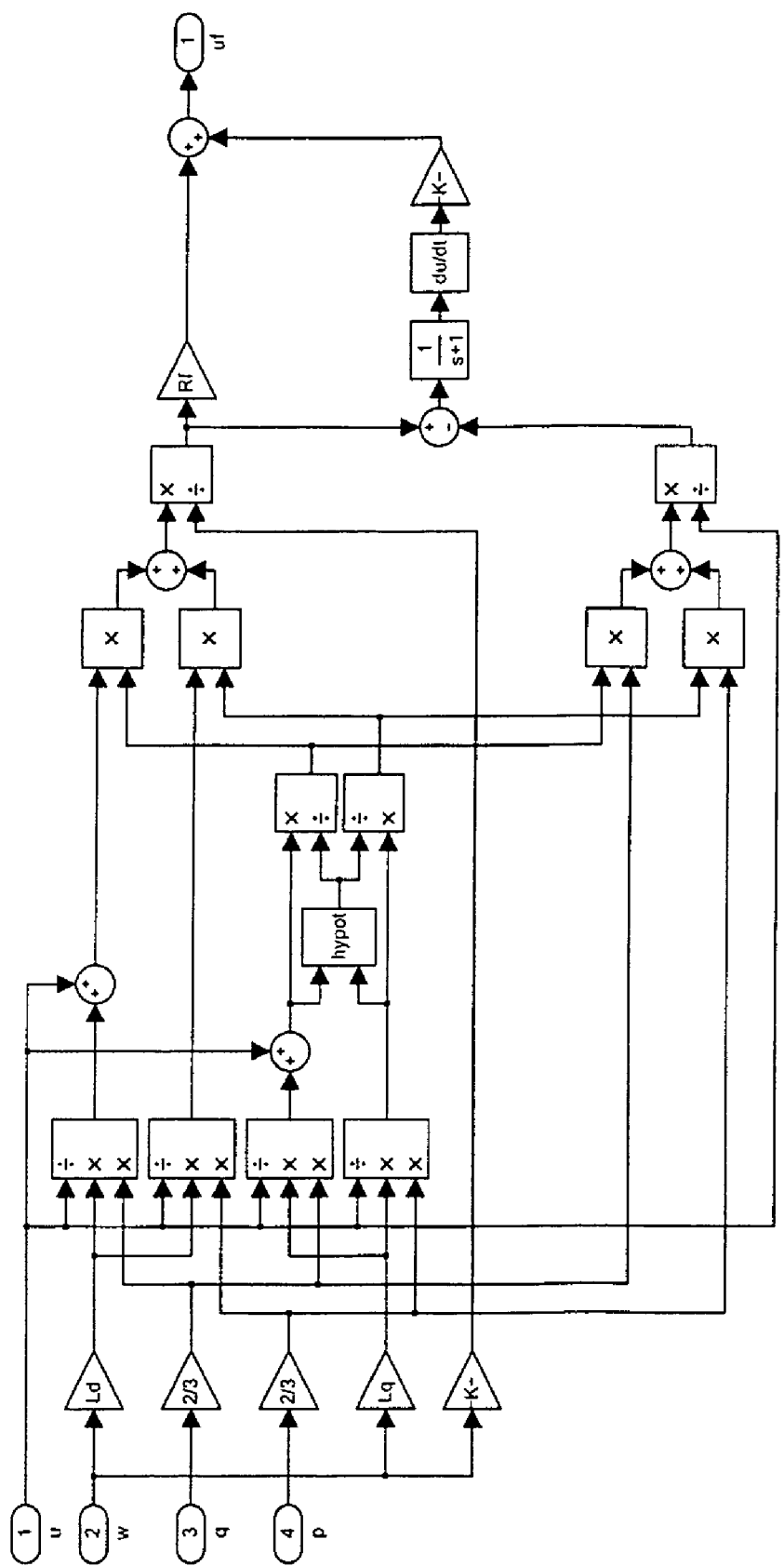
FIG. 8 a schematic diagram of the implementation of the controlled excitation voltage.
Figure 9:
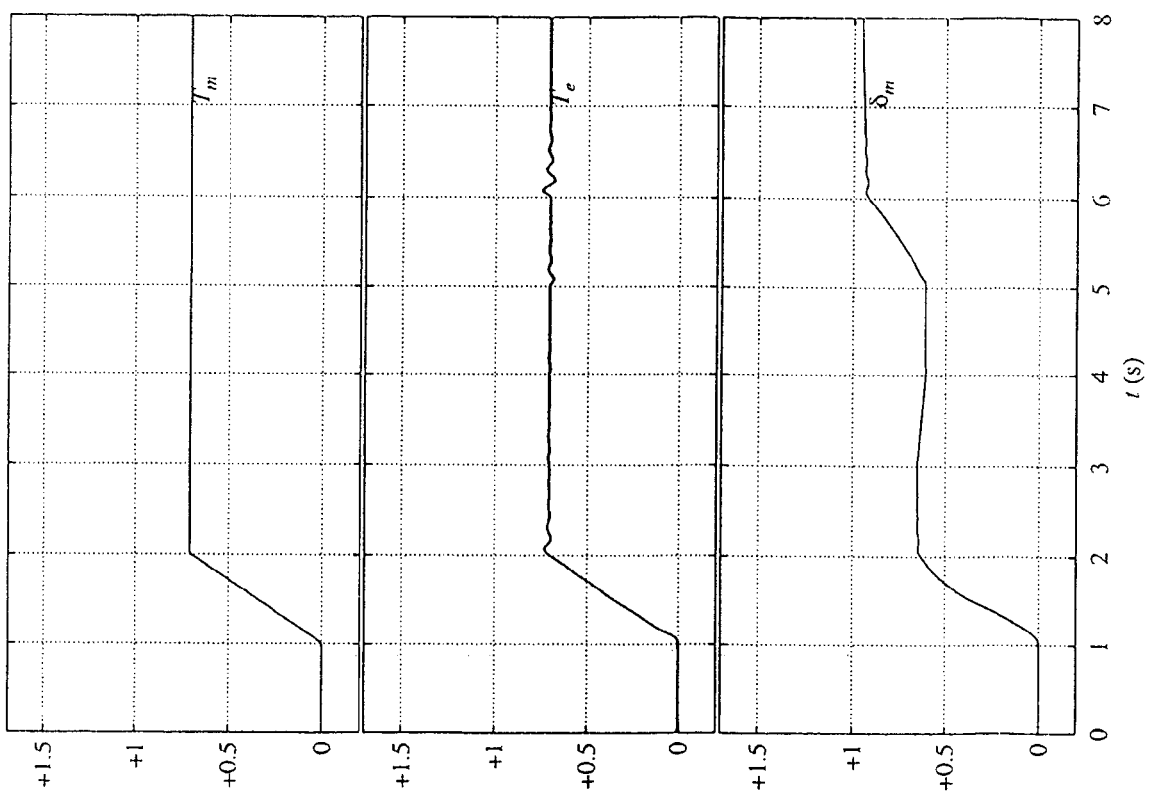
FIG. 9 results of the stimulation; mechanical part of the generator.
Figure 10:
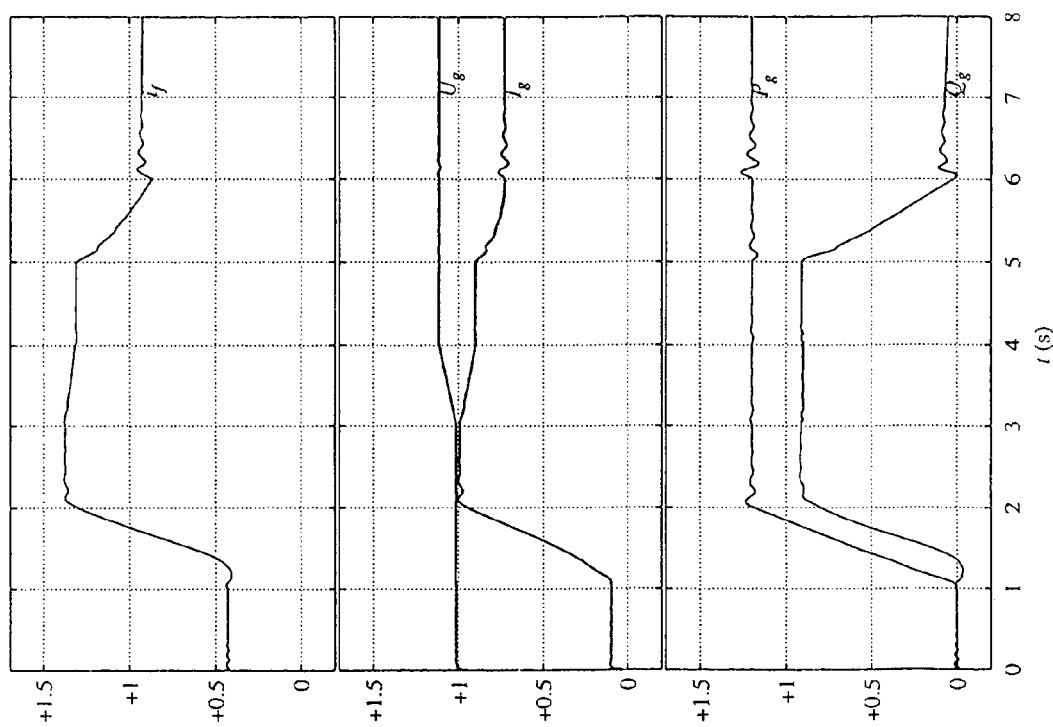
FIG. 10 results of the stimulation; electric part of the generator.

FIG. 8 shows a schematic diagram of the evaluation of the excitation voltage $U_f$. The values of the generator voltage $U_g$, the generator frequency $\omega_g$, the desired reactive power $Q_g$ and the desired active power $P_g$ serve as the input values, as is indicated on the left-hand side of FIG. 8 as the input. Moreover, $L_{md}$ is specified as a fixed value, whereby $L_{md}$ in FIG. 8 is designated by -K-.

The induced voltage $E_f$ is proportional to the field current $I_f$ which, in turn, is proportional to the field voltage (excitation voltage) $U_f$ (amplitudes of alternating current quantities are employed):

$$U_f = R_f I_f,\tag{25}$$

$$E_f = X_{md} I_f.\tag{26}$$

The formula for the stator side, employing complex vectors, is:

$$jE_f = (U_d + jU_q) + j(X_d I_d + jX_q I_q).\tag{27}$$

This can be written as:

$$E_f = (U + X_q I \sin\varphi)\cos\delta + (X_d I \cos\varphi)\sin\delta,\tag{28}$$

wherein φ is the phase angle between U and I and δ is the displacement angle or load angle between $E_f$ and U. It can be demonstrated that $$(U + X_q I\sin\varphi) + j(X_q I\cos\varphi) = E'_d + jE'_q = E' e^{j\delta},\tag{29}$$

and thus that $$\cos\delta = \frac{E'_d}{E'},\tag{30}$$

$$\sin\delta = \frac{E'_q}{E'},\tag{31}$$

which can then be used in formula (28). Since the active power P and the reactive power Q can be expressed in a three-phase system as $$P = \frac{3}{2} UI\cos\varphi,\tag{32}$$

$$Q = \frac{3}{2} UI\sin\varphi,\tag{33}$$

the following can be constructed using the amplitude of the output voltage U and of the current intensity I $$I\cos\varphi = \frac{2P}{3U},\tag{34}$$

$$I\sin\varphi = \frac{2Q}{3U},\tag{35}$$

which can then be employed in formulas (28) and (29). All of the reactances are expressed as $$X = \omega L,\tag{36}$$

since the generator frequency can vary. The equations given above are valid for stationary modes of operation. In order to improve the behavior in the case of faster dynamics, an amount $$U'_f = L_{md} \frac{d(I_f - I_d)}{dt} \quad (37)$$

is added to the output, using $$I_d = I \sin \phi \cos \delta + I \cos \phi \sin \delta \quad (38)$$

as the current component of the direct axis.

On the basis of formulas (25) to (38), it is then possible to construct the general formula for the excitation voltage $U_f$ which, as schematically depicted in FIG. 8, is expressed as a function of the generator voltage, the generator frequency, the active power and the reactive power of the generator as well as of the constant $L_{md}$.

The control has three reference points, each of these points influencing one power quantity in the system, namely, (I) the torque of the turbine $T^*_t$ for the active power P, (II) the power factor angle $\phi_g$ for the reactive power $Q_g$ of the generator, as well as (III) the voltage $u^*_C$ over the capacitance in the intermediate circuit for the reactive power $Q_n$ of the grid 4.

In the stationary mode of operation, the mechanical power transferred by the torque of the turbine to the generator shaft is completely transferred to the grid, which determines the active power P throughout the entire system (I).

The power factor angle of the generator acts upon the excitation system (II).

The voltage over the capacitance in the intermediate circuit acts like a generator excitation for the inverter that is coupled to the grid (III). Its reference value $u^*_C$ can be ascertained from the amplitude of the grid voltage as well as from the desired active power and reactive power. In this context, the calculations are considerably simpler than in the case of excitation by the generator since there is no difference between the reactances along the axes d and q. The equation for the grid side employing complex vectors is expressed as follows:

$$\underline{U}_i = \underline{U}_n + j\omega_n L \underline{I}_n. \quad (39)$$

This can be written as $$U_i \sqrt{(U_n + \omega_n L I_n \sin\phi_n)^2 + (\omega_n L I_n \cos\phi_n)^2}, \quad (40)$$

wherein $\phi_n$ is the angle between $\underline{U}_n$ and $\underline{I}_n$. Therefore, by using equations (34) and (35) for the grid side, one obtains the following:

$$U_i = \sqrt{\left(U_n + \omega_n L \frac{2Q_n}{3U_n}\right)^2 + \left(\omega_n L \frac{2P_n}{3U_n}\right)^2}. \quad (41)$$

This expression for $U_i$ can then be employed in equation (20a), which yields an expression for $u^*_C$.

Several transitions are simulated, whereby one second of time was given for each transition. The individual characteristic quantities are compiled in graphic form in FIGS. 9 to 12.

Here, the system is operated without load in the area between 0 and 1. In this case, the mechanical torque $T_m$ as well as the electromagnetic torque $T_e$ and the load angle $\delta_m$ equal zero (see FIG. 9).

A first transition is then simulated in the area between 1 and 2. In this transition, the torque of the turbine is shifted to the nominal value. In other words, in FIG. 6, the value of tt* is shifted to the nominal value. Subsequently, the torque $T_m$ of the turbine no longer changes and remains constant (see FIG. 9, uppermost part).

Figure 11:
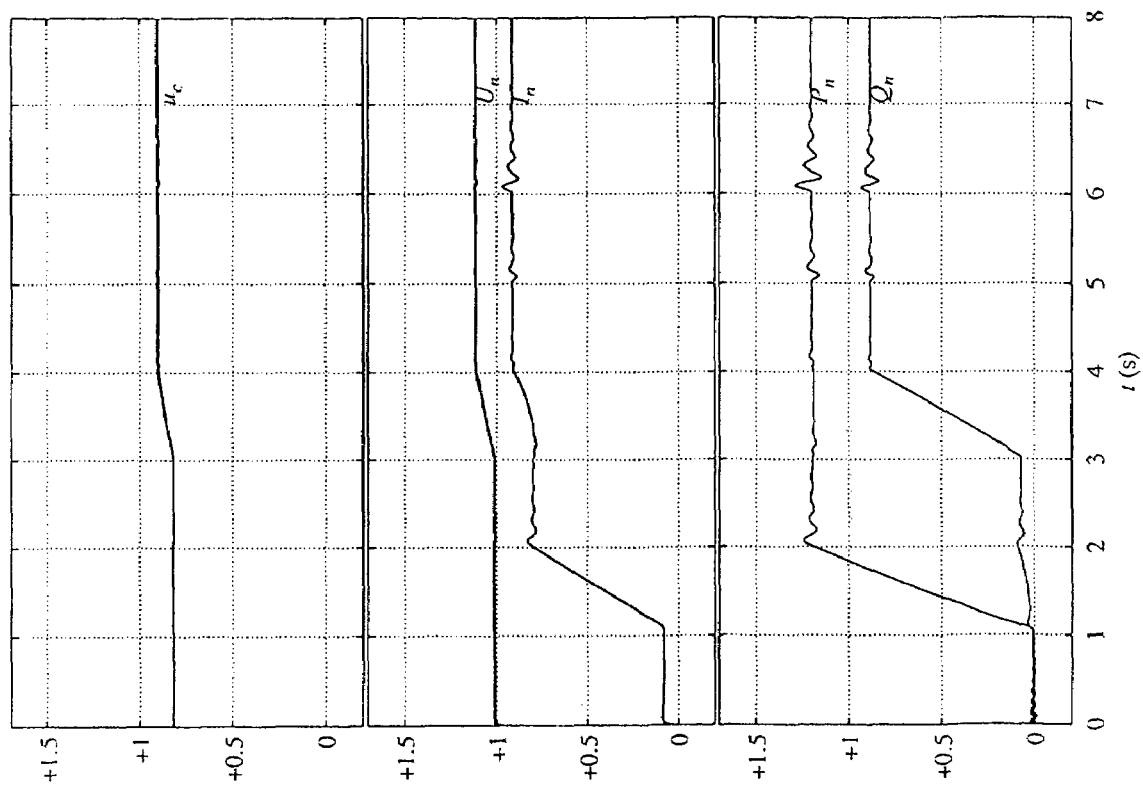
FIG. 11 results of the stimulation: grid.

In response to this transition, the excitation current $i_f$ (see the top of FIG. 10) and, by the same token, the generator current $i_g$ (see the middle of FIG. 10) increase. The reactive power $Q_s$ as well as the active power $P_g$ of the generator rise (see the bottom of FIG. 10). In response to this, one can also see an increase in the current $i_n$ supplied to the grid (see the middle of FIG. 11) and in the active power $P_n$ fed to the grid. The reactive power $Q_n$ fed to the grid remains essentially at zero during this first transition. The voltage $u_C$ in the intermediate circuit likewise remains constant, as can be seen at the top of FIG. 11.

The second transition takes place in the area between 3 and 4. During this transition, the voltage $u_C$ in the intermediate circuit 8, which acts on the grid side like the excitation of the generator, is likewise raised in order to obtain the nominal value of the reactive power in the grid. In other words, the reference value of the capacitance voltage of $u^*_C$ shown in FIG. 6 is raised somewhat above the nominal value. The value of the reactive power $Q_n$ supplied to the grid does indeed respond, as can be seen at the bottom of FIG. 11. On the side of the generator, the voltage $U_g$ likewise increases slightly, which gives rise to an adjustment of the excitation voltage $u_f$ in order to retain the reactive power, although this is done at a different operating point with a different power factor.

During the third transition, which is the area between 6 and 7, the power factor of the generator is set to 1, which means that the excitation (see field current $i_f$, top of FIG. 10) is adjusted. In other words, in FIG. 6, the value of phg* is reduced somewhat below the nominal value. The reactive power $Q_g$ on the side of the generator can be essentially eliminated through this step (see the bottom of FIG. 10).

Figure 12:
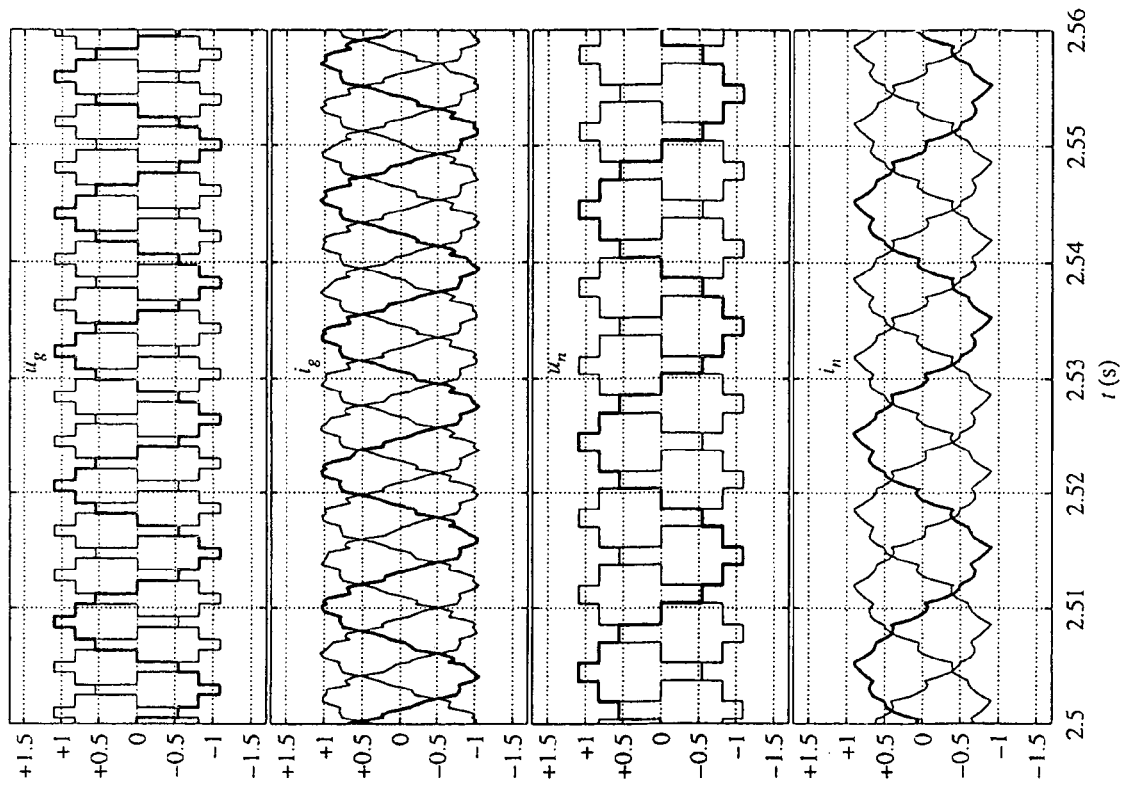
FIG. 12 results of the stimulation: waveforms of the voltage and current on the side of the generator and on the side of the grid.

For the sake of completeness, FIG. 12 shows the appertaining waveforms of the voltage ($U_g$ and $U_n$) as well as of the current ($i_g$ and $i_n$) on the generator and grid sides, respectively.

The invention claimed is:

1. A method for controlling a static frequency converter, the method comprising:
   generating a first alternating voltage having a first frequency using a generator having at least one excitation coil;
   rectifying the first frequency using a switched rectifier so as to provide direct voltage in an intermediate circuit;
   converting the direct voltage in the intermediate circuit into a grid alternating voltage having a grid frequency using a switched inverter;
   regulating at least a strength of an excitation field generated by the at least one excitation coil using a regulator so as to control power fed into the grid;
   wherein control of the frequency converter in the rectifier is performed in such a manner that the frequency of the alternating voltage of the rectifier on a generator side is regulated to an essentially constant value of the first frequency, and
   wherein control in the inverter is performed based on a measured value of the direct voltage in the intermediate circuit.

2. The method as recited in claim 1, wherein the regulator further regulates a phase relation between the frequency converter voltage and the generator voltage and regulates the grid voltage.

3. The method as recited in claim 1, wherein the direct voltage in the intermediate circuit is used as a regulating parameter over at least one capacitance in the intermediate circuit.

4. The method as recited in claim 1, wherein the control in the inverter is performed in such a way that a frequency ($\omega_i$) of the inverter on the grid side is regulated according to the following function $\omega_i = \omega_n + \Delta\omega$ wherein the function $\Delta\omega$ is expressed by $\Delta\omega \triangleq K_P(u_C - u^*_C)$, wherein $K_p$ stands for a specified, proportional control gain, and $u^*_c$ stands for a reference value of the capacitance voltage that is selected as a function of the desired reactive power.

5. The method as recited in claim 4, wherein the capacitance voltage is selected dynamically.

6. The method as recited in claim 4, wherein the function $\Delta\omega$, additionally taking into consideration the damping, is employed with a predefined differential control gain $K_D$ for purposes of the control in the inverter, according to the formula:

$$\Delta\omega' \triangleq K_P(u_C - u^*_C) + K_D \frac{d}{dt}(u_C - u^*_C) = \Delta\omega + \frac{K_D}{K_P}\frac{d\Delta\omega}{dt}.$$

7. The method as recited in 1, wherein the strength of the excitation field generated by the at least one excitation coil and its phase relation is set by means of an excitation voltage ($U_f$) that is controlled as a function of the generator voltage ($U_g$), the generator frequency ($\omega_g$), the active power of the generator ($P_g$) and the reactive power ($Q_g$) of the generator.

8. The method as recited in claim 7, wherein the excitation voltage ($U_f$) is regulated according to the following formula:

$U_f = R_f I_f + U'_f$

9. The method as recited in claim 1, wherein the frequency converter is a three-stage converter, wherein the direct voltage in the intermediate circuit is ascertained as the mean value of the voltages present over the two capacitances between a (+) level and a (0) level as well as between the (0) level and a (−) level.

10. The method as recited in claim 1, wherein at least one of the controlled rectifier and the controlled inverter are operated in fundamental-frequency clocking.

11. The method as recited in claim 1, wherein the static frequency converter includes thyristors.

12. The method as recited in claim 11, wherein the thyristors include at least one of GTOs, IGBTs, MOSFETs and ICGTs.

13. The method as recited in claim 1, wherein a central control unit is provided which uses a measurement of at least one of the voltage and the current upstream and/or downstream from the static frequency converter to make an adaptation of the amplitude of the alternating voltage fed into the grid by appropriately actuating the regulator.

14. The device as recited in claim 1, wherein the controlled rectifier is a three-level rectifier and the controlled inverter is a three-level inverter and are both operated in fundamental-frequency clocking.

15. A power generating device comprising:
  a generator having at least one regulatable excitation coil;
  a static frequency converter including at least one controlled rectifier in fundamental-frequency clocking, at least one controlled inverter in fundamental-frequency clocking, an intermediate circuit, and at least one control unit configured to regulate the rectifier and the inverter; and
  a device configured to measure values of a direct voltage and disposed in the intermediate circuit, wherein the values are used for control of the inverter.

16. The device as recited in claim 15, further comprising a regulator configured to regulate at least one of an amplitude and a phase relation of the excitation voltage for the regulatable excitation coil, and configured to adapt the strength or phase relation of the excitation field to requirements of the grid.

* * * * *